United States Patent
Gupta et al.

(10) Patent No.: US 10,223,598 B2
(45) Date of Patent: Mar. 5, 2019

(54) METHOD OF GENERATING SEGMENTED VEHICLE IMAGE DATA, CORRESPONDING SYSTEM, AND VEHICLE

(71) Applicants: Volkswagen Aktiengesellschaft, Wolfsburg (DE); AUDI AG, Ingolstadt (DE); Dr. Ing. H.C. F. Porsche AG, Stuttgart (DE)

(72) Inventors: Somudro Gupta, Belmont, CA (US); Martin Hempel, Foster City, CA (US); Premkumar Natarajan, Belmont, CA (US); Muneeb Saleem, Foster City, CA (US)

(73) Assignees: VOLKSWAGEN AKTIENGESELLSCHAFT, Wolfsburg (DE); AUDI AG, Ingolstadt (DE); DR. ING. H.C.F. PORSCHE AG, Stuttgart (DE)

(*) Notice: Subject to any disclaimer, the term of this patent is extended or adjusted under 35 U.S.C. 154(b) by 102 days.

(21) Appl. No.: 15/437,394

(22) Filed: Feb. 20, 2017

(65) Prior Publication Data
US 2018/0239968 A1 Aug. 23, 2018

(51) Int. Cl.
| G06T 7/11 | (2017.01) |
| G06K 9/00 | (2006.01) |
| G01C 21/30 | (2006.01) |

(52) U.S. Cl.
CPC ..... *G06K 9/00798* (2013.01); *G06K 9/00637* (2013.01); *G06K 9/00791* (2013.01);
(Continued)

(58) Field of Classification Search
None
See application file for complete search history.

(56) References Cited

U.S. PATENT DOCUMENTS 7,389,178 B2 6/2008 Raz et al.
8,788,134 B1 7/2014 Litkouhi et al.
(Continued)

FOREIGN PATENT DOCUMENTS

DE 102004047479 A1 4/2006
DE 202010011535 U1 11/2011
(Continued)

OTHER PUBLICATIONS

Wikipedia, Homography (computer vision), Retrieved from "https://en.wikipedia.org/w/index.php?title=Homography_(computer_vision)&oldid=791931155" on Aug. 17, 2017.
(Continued)

*Primary Examiner* — Eileen M Adams
(74) *Attorney, Agent, or Firm* — Slayden Grubert Beard PLLC

(57) ABSTRACT

In a method and system for generating vehicle image data, and to improve the generation of vehicle image data, 2D object information having at least 2D object data and object location data of one or more objects, perspective vehicle image data, and vehicle image location data for at least a portion of said vehicle image data are obtained. The object location data is compared with said vehicle image location data; and in case said object location data corresponds to said image location data, said 2D object data is correlated with said perspective vehicle image data using the object location data and the vehicle image location data to obtain a segmented vehicle image dataset.

16 Claims, 10 Drawing Sheets

(52) U.S. Cl.
CPC .............. *G06T 7/11* (2017.01); *G01C 21/30* (2013.01); *G06T 2207/20084* (2013.01); *G06T 2207/30256* (2013.01)

(56) References Cited

U.S. PATENT DOCUMENTS

| | | |
|---|---|---|
| 9,443,153 B1 | 9/2016 | Gupta et al. |
| 2010/0302069 A1 | 12/2010 | Frank et al. |
| 2015/0016669 A1 | 1/2015 | Tabb |
| 2015/0078624 A1 | 3/2015 | Fukuda |
| 2015/0142533 A1 | 5/2015 | Shalev |
| 2015/0339924 A1 | 11/2015 | Cook et al. |
| 2017/0016740 A1* | 1/2017 | Cui .................. G01C 21/30 |
| 2017/0200061 A1* | 7/2017 | Julian ................ G06T 11/60 |
| 2017/0206426 A1* | 7/2017 | Schrier ............... B60W 50/00 |

FOREIGN PATENT DOCUMENTS

| | | |
|---|---|---|
| DE | 102011079003 A1 | 1/2013 |
| WO | 2015057325 A1 | 4/2015 |

OTHER PUBLICATIONS

Urmson, Chris et al., "Autonomous Driving in Urban Environments: Boss and the Urban Challenge," Journal of Field Robotics, vol. 25, No. 8, pp. 425-466, Aug. 1, 2008.
Shashua, Amnon, "CVPR 2016 Keynote: Autonomous Driving, Computer Vision and Machine Learning," Youtube, URL: https://www.youtube.com/watch?v=n8T7A3wqH3Q, 1 page, Jun. 27, 2016.
International Search Report and Written Opinion, Application No. PCT/EP2018/050535, 13 pages, dated May 8, 2018.

\* cited by examiner

METHOD OF GENERATING SEGMENTED VEHICLE IMAGE DATA, CORRESPONDING SYSTEM, AND VEHICLE

TECHNICAL FIELD

The present invention relates to the field of vehicles and in particular to vehicular image processing.

BACKGROUND

In the recent past, assisted driving systems for passenger vehicles became available that provide various support functions to the driver on the basis of processing sensor data of the vehicle's surroundings. The developments in this area lead to the rise of autonomous vehicle systems, allowing the operation of vehicles on typical roads without or with only little human intervention.

A portion of assisted driving systems as well as autonomous vehicle systems, as discussed above, use image data for at least part of their functionality, obtained from one or more cameras. For example, typical lane keeping features detect road markings from live camera images to allow determining an unintended lane departure.

For other applications, pre-processed image data is useful, e.g., images with annotations or "labels". One example for such application is the automatic determination of whether a parking space in view of a camera is occupied or available.

While algorithms exist that allow automatic image annotation, reliable annotation of objects in vehicle image data is difficult due to the distortion caused by the typical angle of view of a vehicle camera, as well as the problem of moving objects, such as other vehicles, creating temporal occlusions, reflections, and other optical disturbances.

Accordingly, an object exists to improve the generation of vehicle image datasets, such as for, but not limited to, annotation or labeling applications.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect of the present invention, a method of generating segmented vehicle image data is provided. The method comprises at least the steps of obtaining 2D object information having at least 2D object data and object location data of one or more objects, obtaining perspective vehicle image data from one or more sensors of a vehicle, determining vehicle image location data for at least a portion of said vehicle image data, comparing said object location data with said vehicle image location data, and in case said object location data corresponds to said image location data, correlating said 2D object data with said perspective vehicle image data using the object location data and the vehicle image location data to obtain a segmented vehicle image dataset.

A basic idea of the present invention is to use 2D objects for segmenting perspective vehicle image data by correlating the 2D objects to the perspective vehicle image data. The aforesaid basic idea is based on the recognition of the inventors of the instant application that it is typically easier to obtain high-quality 2D object information, in view that no perspective distortion is given and that object shapes as a result may be simpler. Accordingly, the invention allows the use of 2D object data, which can be provided easily and with a relatively high accuracy, for segmentation purposes of perspective vehicle images.

This aspect and other aspects of the invention will be apparent from and elucidated with reference to the embodiments described hereinafter.

DETAILED DESCRIPTION

Figure 1:
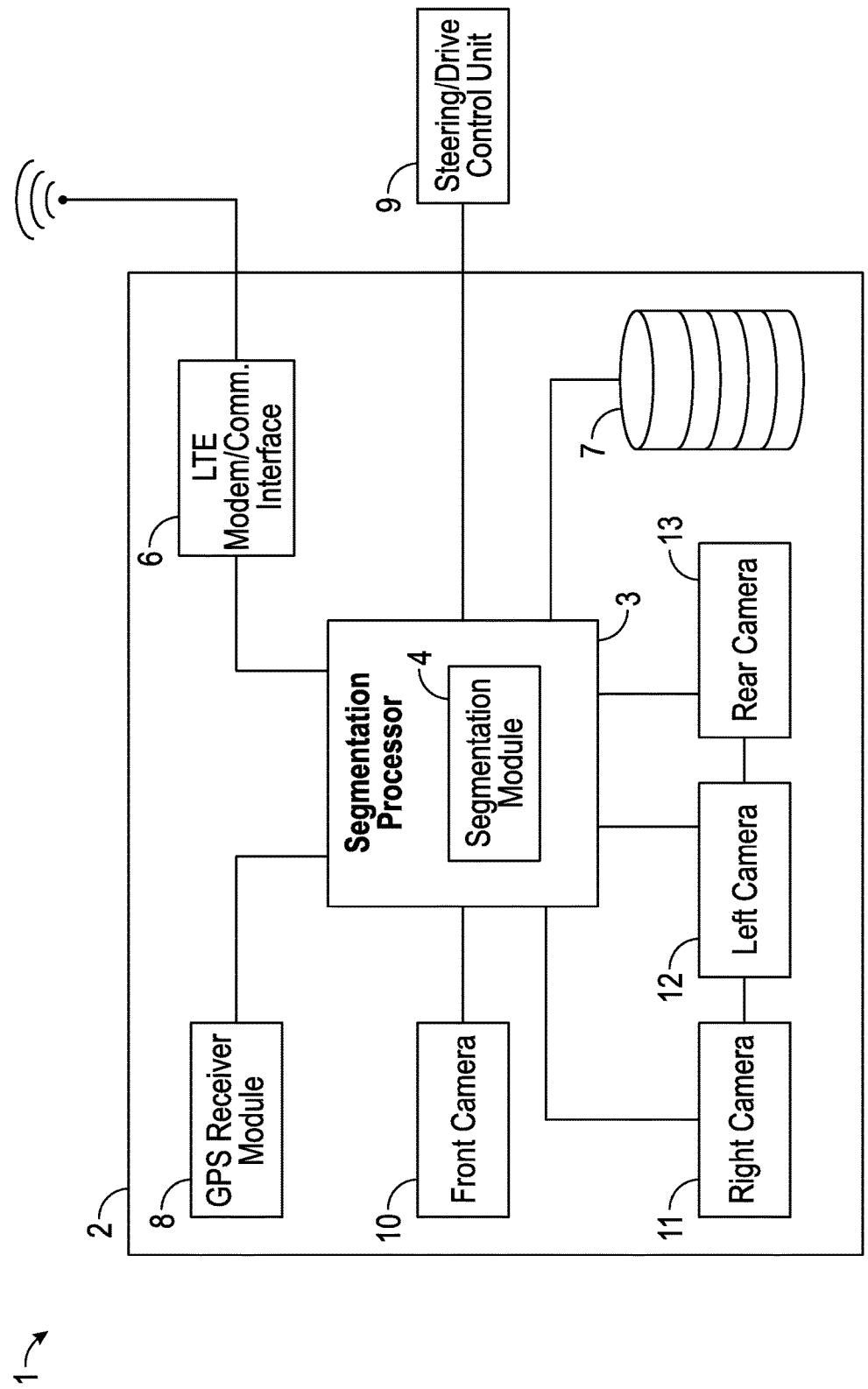
FIG. 1 shows an embodiment of a vehicle 1 having a system for generating segmented vehicle image data 2 in a schematic block diagram.

Technical features described in this application can be used to construct various embodiments of methods for generating segmented vehicle image data and systems for generating segmented vehicle image data according to the preceding and following description. Some embodiments of the invention are discussed so as to enable one skilled in the art to make and use the invention.

In the following explanation of the present invention according to the embodiments described, the terms "connected to" or "connected with" are used to indicate a data connection between at least two components, devices, units, or modules. Such a connection may be direct between the respective components, devices, units, or modules; or indirect, i.e., over intermediate components, devices, units, or modules. The connection may be permanent or temporary; wireless or conductor based.

For example, a connection may be provided over a CAN (controller area network), LAN (local area network), WAN (wide area network), PAN (personal area network), comprising, e.g., the Internet, Ethernet networks, cellular networks, Bluetooth networks, ZigBee networks, and/or Wi-Fi networks using a corresponding suitable communications protocol. In some embodiments, a wireless network connection is used to send and receive the 2D object information, the correlated object data, and/or the vehicle perspective image data.

According to a first exemplary aspect, a computer-implemented method of generating segmented vehicle image data is provided. In the context of the present invention, the term "vehicle image data" or "vehicular image data" is understood to refer to environmental image data, obtained by a land, air or water vehicle, i.e., image data of at least part the respective vehicle's surroundings. The vehicle image data typically is perspective image data, and may, e.g., show perspective distortion.

The terms "image data" and "image" in the context of this invention refers to pixel data, rendering an image or a video, and having a plurality of pixels. Although in the following, the terms "image" or "imaging" are used, it is understood that these terms may likewise refer to still imaging as well to video, i.e., motion imaging.

Image segmentation in general refers to the process of partitioning an image into multiple segments or superpixels, the latter of which typically represents an aggregation of pixels. In the present context, image segmentation refers to the marking of groups of pixels as belonging to an identified, homogeneous object, comparable to the segmentation in typical object-based image analysis. It is noted that in the present context, not every pixel of an image necessarily needs to be assigned to an object.

According to the method of the present aspect, 2D object information having at least 2D object data and object location data of one or more objects is obtained.

The 2D object data may refer to any suitable object, depending on the respective application. In the present context, 2D object data refers to object data that is correlated with a two-dimensional reference plane, i.e., object data that is "flat" within or parallel to the respective two-dimensional reference plane.

In one embodiment, the 2D object data comprises shape data (geometry/outline) of one or more objects, such as obtained by manual or automatic image analysis. For example, the object data may comprise the shape of one or more parking spaces, parking lots, road markings, such as an arrow markings and lane markings, or a pedestrian crosswalk, obtained from image analysis of a remotely sensed image, such as a satellite image. Since remotely sensed images of a "flat" 2D reference plane typically shows at least no substantial perspective distortion, corresponding 2D object information can be generated relatively easy, such as by automatic image analysis algorithms.

It is noted that in the discussed example of image analysis, it is not necessary that the respective 2D image is obtained as part of the 2D object information, even though the 2D object information may be generated using image data. However, in a corresponding embodiment, the 2D object information may additionally comprise image data.

The 2D object data may in corresponding embodiments comprise an object identifier, such as in the above example an object identifier corresponding to "parking space" or "crosswalk". In more general terms, the object data may comprise any suitable statistic(s), such as shape and/or context of one or more objects as object identifiers.

The 2D object information further comprises object location data, pertaining to an absolute or relative location of the respective object. In one embodiment, the object location data is geolocation data, corresponding to the "real-world" location of an object. Multiple systems for obtaining geolocation data exist, such as GPS, Glonass, BeiDou, and Galileo systems. In a further embodiment, the object location data comprises high-precision geolocation data, i.e., having a spatial resolution of at least 50 cm, preferably 5 cm, and particularly 1 cm, such as obtainable using an "POS LV" positioning system, available from Applanix, Ontario, Canada.

According to the present aspect and in a further step, perspective vehicle image data is obtained from one or more sensors of a vehicle. For example, the perspective vehicle image data may be obtained from one or more suitable still or video cameras, radar or LIDAR scanners, ultrasonic sensors, or any other type of sensor that allows to provide perspective vehicle image data, i.e., pixel data. The image data may be obtained directly from said sensors or indirectly, i.e., over intermediate components and/or devices.

It is noted that while in some embodiments, one or more sensors may be used that each provide multiple pixels, in further embodiments, sensors may be used that each provide a single pixel. In the latter embodiments, the output of the sensors is combined to provide vehicle image data having multiple pixels, e.g., by a suitable image processor.

According to the present aspect and in a further step, vehicle image location data is determined for at least a portion of the vehicle image data. The term "vehicle image location data" in this context refers to information of an absolute or relative location, pertaining to at least a portion of the obtained perspective vehicle image data. In one embodiment, the vehicle image location data comprises location information of one or more pixels of the perspective vehicle image data. In a further embodiment, the vehicle image location data comprises location information for each pixel of the perspective vehicle image data.

In one embodiment, the vehicle image location data is directly or indirectly derived from geolocation data, corresponding to the "real-world" location the vehicle and/or the image. For example, geolocation data may be obtained by the vehicle according to a given schedule and then synchronized with the vehicle image data using time stamps. In this example, an interpolation may be applied to estimate the geolocation of the vehicle in case of image data time stamps between two geolocation data recordings. The synchronization may be applied upon obtaining the vehicle image data or at a later stage.

Multiple systems for obtaining geolocation data exist, as discussed in the preceding. In a further embodiment, the vehicle image location data comprises high-precision geolocation data, i.e., having a spatial resolution of at least 50 cm, preferably 5 cm, and particularly 1 cm, such as obtainable using an "POS LV" positioning system, available from Applanix, Ontario, Canada.

It is noted that according to the present aspect, the aforementioned steps may be conducted in the described order, in a differing order, or simultaneously, without leaving the scope of the present invention. In case of sufficient processing power of the respective computer processor that is executing the method of the present aspect, and in a corresponding embodiment, at least some of the aforementioned steps are conducted simultaneously.

According to the present aspect and once the object location data and the vehicle image location data is obtained, the object location data and the vehicle image location data is compared with each other. This step in one embodiment may comprise a mathematical transformation in case the data formats differ or in case relative location data is used having differing reference points.

In case the object location data corresponds to the image location data, i.e., in case a "match" is found, the 2D object data is correlated with the perspective vehicle image data to obtain a segmented perspective vehicle image dataset. The dataset comprises at least part of the 2D object data and at least part of the perspective vehicle image data.

For example, in case it is found that the location of one or more objects of the 2D object data corresponds to image location data of the vehicle image data, such as when the one or more objects are within the field of view of the vehicle's camera that acquired the perspective vehicle image data, a dataset is generated with the 2D object data and the corresponding perspective vehicle image data.

In one further embodiment, the dataset comprises at least the respectively "matched" object and the corresponding part of the perspective vehicle image data.

The stored dataset allows further processing, such as "online", e.g., for autonomous or assisted vehicle driving functions, and/or "offline", e.g., to train an artificial neural network or to collect traffic information. Correspondingly, the segmented vehicle image dataset may in one embodiment be provided for further processing.

In one example of an "online use" and in case an object having an object identifier corresponding to "crosswalk" is determined to be in the camera's current field of view, it is possible to parameterize a collision prevention system of the vehicle correspondingly, in view that it is more likely that a pedestrian is within a crosswalk, e.g., compared to a normal street or highway scenario.

In another alternative or additional embodiment, the dataset is stored. In another alternative or additional embodiment, the dataset may be uploaded to a server/cloud computing service, e.g., for an "offline" application.

Storage of the dataset may be permanent or temporary using a suitable storage device or medium in according embodiments.

As discussed in the preceding, the segmented vehicle image dataset comprises at least part of the 2D object data and at least part of the perspective vehicle image data. The dataset may in corresponding embodiments further comprise the associated object location data, image location data, and/or further data.

According to an embodiment, the step of correlating comprises transforming or projecting the 2D object data from a two-dimensional reference plane to a vehicular perspective reference frame of the perspective vehicle image data. The present embodiment provides an automatic transformation of the 2D object data into the respective perspective reference frame, i.e., the coordinate system of the perspective vehicle image data. It is noted that the perspective vehicle image data may be in 2D or 3D format (including an image and a 3D model), however, the perspective vehicle image data always comprises a perspective image component, i.e., "3D information", while the 2D object data is "flat", as discussed in the preceding. Transforming the 2D object data may be conducted using matrix calculus, such as a linear algebra transformation. In one embodiment, the transformation uses a transformation matrix. For example, a pre-calculated/defined transformation matrix may be used, which is calibrated to the respective one or more sensors of the vehicle.

After a successful transformation, the resulting 2D object data matches the perspective of the perspective vehicle image data.

According to a further embodiment, the 2D object data is correlated with a two-dimensional reference plane and the two-dimensional reference plane is parallel to a driving surface of said vehicle.

As discussed in the preceding, the object data is "flat" within or parallel to the respective two-dimensional reference plane. According to the present embodiment, this reference plane is parallel to the plane in which the vehicle is operable, which in many examples may be ground, i.e., earth's surface. In one example, the one or more objects are thus (earth) surface objects.

It is noted that in the present context, the term "parallel to" includes the case of the reference plane being identical with the driving surface of the vehicle.

According to a further embodiment, the 2D object information is obtained from remotely sensed image data, sometimes also referred to as "aerial image data". The remotely sensed image data may be obtained by suitable satellites, planes, drones, or other air-/spacecraft.

In particular in case of surface objects, the use of remotely sensed imagery allows a precise and efficient generation of 2D object data, either manually or automatically. It will be readily apparent that in view of a lack of substantial perspective distortion and the resulting relatively simple shapes of "flat" or surface objects as well as the limited occlusions given, a manual generation of 2D object data may be efficiently possible using remotely sensed imagery. However, this also applies to an automatic processing of remotely sensed images, for example as used in Geographic Object-Based Image Analysis. Within the field of vehicles, it is noted that WO 2015/057325 A1 discloses a method for automatically detecting and identifying parking lots in remotely-sensed images. Accordingly, and in another embodiment of the present method, the 2D object information is obtained by automatically processing remotely sensed image data.

As discussed in the preceding and in one embodiment, the 2D object data comprises shape data of one or more objects. According to a further embodiment, the 2D object data comprises vector (graphics) information of the one or more objects. The use of vector graphics decreases the necessary computations when correlating the 2D object data with the perspective vehicle image data and thus allows to reduce the time needed for this step.

In another embodiment, the 2D object data comprises primitive object data. In particular, the primitive object data may comprise at least one of a line, polyline, polygon, complex polygon, Bézier curve, bezigons, circle, ellipse, spline, NURB, superellipse, or superellipsoid. It is noted that any suitable other 2D vector data type may be used, depending on the application.

According to another embodiment, the method of the present aspect further comprises the step of automatically annotating the segmented vehicle image dataset. In the context of the present invention, the term "automatically annotating", also referred to as automatic "tagging" or "labeling", refers to the automatic generation of metadata for one or more objects in the segmented vehicle image dataset. In the present field of vehicular image processing and in one embodiment, the metadata may refer to vehicle context information, e.g., information referring to road object states. In the above-mentioned example of a parking space as an object, a corresponding road object status may be "occupied" or "available". This functionality corresponds to a "parking space occupancy detector". In another example of a driving lane as an object, a corresponding road object status may be whether the lane allows to go straight, left, and/or right close to an intersection.

The road object status may, once determined and in one embodiment, be provided to an assisted/automated driving system of a vehicle. In one example, an annotated segmented vehicle image dataset is provided to a parking assist system to semi-automatically or fully automatic guide the vehicle to an available parking space in a parking lot and then park the vehicle in the respective parking space. In another alternative or additional example, the annotated, segmented vehicle image dataset is provided to an assisted or automated driving system to allow determining whether the current lane of the vehicle allows to take the desired direction at the next intersection.

According to a further embodiment, the segmented vehicle image dataset is provided to an artificial neural network system as training data.

According to a second exemplary aspect, a system for generating segmented vehicle image data is provided. The system comprises a communication interface to receive 2D object information having at least 2D object data and object location data of one or more objects, perspective vehicle image data from one or more sensors of a vehicle, and vehicle image location data for at least a portion of said vehicle image data from a positioning module of a vehicle. The system further comprises a segmentation processor, configured to compare said object location data with said vehicle image location data; and in case said object location data corresponds to said image location data, correlate said 2D object data with said perspective vehicle image data using the object location data and the vehicle image location data to obtain a segmented vehicle image dataset.

The communication interface may be of any suitable type for conductor based or wireless operation, such as a CAN-Bus interface, an Ethernet interface, a Wi-Fi interface for communication according to one or more of the IEEE 802.11 standards, a cellular communication interface adapted for, e.g., one of the GSM, EV-DO, and/or LTE standards, a Bluetooth communication interface, or an interface for communication according to the IEEE 802.15 group of standards.

The segmentation processor is configured with memory/storage comprising suitable programming/software to provide the functionality discussed in the preceding and also in the following description. The software can include a kernel, operating system and/or a shell or interface. One or more application programs or modules may be "loaded", i.e., transferred from storage for execution by the processor. In one example, the processor is an image processor.

According to an embodiment, the system comprises an annotation module configured to determine a road object status of at least one object.

The system according to the present aspect in further embodiments may be configured according to one or more of the embodiments, discussed in the preceding with reference to the preceding aspect, and in the following with reference to further aspects described.

With respect to the features of the system according to the present aspect as well as the terms used, reference is made to the corresponding features and definitions of the preceding aspect.

According to yet another exemplary aspect, a vehicle with a system for generating segmented vehicle image data is provided.

The vehicle and system comprises a communication interface to receive 2D object information having at least 2D object data and object location data of one or more objects. Furthermore, the vehicle and system comprises one or more sensors for obtaining perspective vehicle image data, a positioning module for obtaining vehicle image location data for at least a portion of said vehicle image data; and a segmentation processor. The segmentation processor is configured to compare said object location data with said vehicle image location data; and in case said object location data corresponds to said image location data, correlate said 2D object data with said perspective vehicle image data using the object location data and the vehicle image location data to obtain a segmented vehicle image dataset.

The vehicle according to the present aspect may be of any suitable type of a land, water, or air vehicle, for example a passenger car, commercial vehicle, motorcycle, etc.

The one or more sensors may be of any suitable type to obtain perspective vehicle image data, such as for example one or more suitable still or video cameras, radar or LIDAR scanners, ultrasonic sensors, or any other type of sensor that allows to provide perspective vehicle image data, i.e., pixel data, as discussed in detail in the preceding with reference to the first aspect. The image data may be obtained directly from said sensors or indirectly, i.e., over intermediate components and/or devices.

It is noted that while in some embodiments, one or more sensors may be used that each provide multiple pixels, in further embodiments, sensors may be used that each provide a single pixel. In the latter embodiments, the output of the sensors is combined to provide vehicle image data having multiple pixels, e.g., by a suitable image processor.

The positioning module according to the present aspect is configured for obtaining vehicle image location data for at least a portion of said vehicle image data. The term "vehicle image location data" refers to information of an absolute or relative location, pertaining to at least a portion of the obtained perspective vehicle image data, as discussed in the preceding with reference to the first aspect.

In one embodiment, the positioning module is a geo-positioning module, allowing to obtain the "real-world" location the vehicle and/or the image. Multiple systems for obtaining geolocation data exist, such as GPS, Glonass, BeiDou, and Galileo systems. In a further embodiment, the object location data comprises high-precision geolocation data, i.e., having a spatial resolution of at least 50 cm, preferably 5 cm, and particularly 1 cm, such as obtainable using an "POS LV" positioning system, available from Applanix, Ontario, Canada.

According to another embodiment, the system and vehicle comprises an annotation module configured to determine a road object status of at least one object.

The vehicle according to the present aspect and in further embodiments may be configured according to one or more of the embodiments, discussed in the preceding with reference to the preceding aspects.

With respect to the features of the system according to the present aspect as well as the terms used, reference is made to the corresponding features and definitions of the preceding aspects.

Reference will now be made to the drawings in which the various elements of embodiments will be given numerical designations and in which further embodiments will be discussed.

Specific references to components, process steps, and other elements are not intended to be limiting. Further, it is understood that like parts bear the same reference numerals, when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows an embodiment of a vehicle 1 having a system for generating segmented vehicle image data 2 in a schematic block diagram. It is noted that the present explanation focuses on system 2. Accordingly, the typical components of a vehicle 1 are not shown in the FIGS., so as not to obscure the embodiments shown.

The system for generating segmented vehicle image data 2 according to the present embodiment—also referred to as "system" and "segmentation system" in the following—comprises a segmentation processor 3, which is a microprocessor adapted for image processing, i.e., having suitable software for image processing. The segmentation processor 3 comprises memory (not shown) with suitable programming to provide the functionality of a segmentation module 4, when the programming is transferred from memory for execution by the processor. The functionality of segmentation module 4 will be discussed in further detail in the following description, in particular with reference to the flow chart of FIG. 2.

System 2 further comprises a communication interface, namely an LTE modem 6, e.g., to receive 2D object information, which upon receipt is stored in storage unit 7. Storage unit 7 according to the present embodiment comprises non-volatile flash memory and serves as a database/data storage. A GPS receiver module 8 is provided to determine geolocation information and thus corresponds to the functionality of a (geo)positioning module. GPS module 8 according to the present embodiment is a differential GPS module of POS LV type, available from Applanix, Ontario, Canada that provides high-precision geolocation data.

To enhance the accuracy of the geolocation information, system 2 is connected to a steering/drive control unit 9 of the vehicle 1 to obtain vehicle movement/speed information. Alternatively, the GPS module 8 may be connected to a wheel-mounted rotary shaft encoder (not shown), which measures linear distance traveled and in particular helps constrain GPS outage drift.

In addition to the above, system 2 comprises four sensors, namely according to the present embodiment video cameras 10-13, arranged to observe all sides of vehicle 1. The cameras 10-13 provide perspective vehicle image data to segmentation processor 3 over a suitable Ethernet data connection. Cameras 10-13 are of color and infrared type. In the present embodiment, cameras 10-13 are directed downwards at an at an exemplary angle of 15 degrees to picture a surface area of a driving surface, adjacent to the vehicle 1, and to provide images of "static road features" in the vicinity of vehicle 1. It is noted that system 2 can be used while the vehicle 1 is moving/driving, and also while stationary.

The system 2 additionally comprises a power supply (not shown) that is connected to a 12V battery power system (also not shown) of vehicle 1. The power supply provides all components of system 2 with the necessary operating power.

Figure 2A:
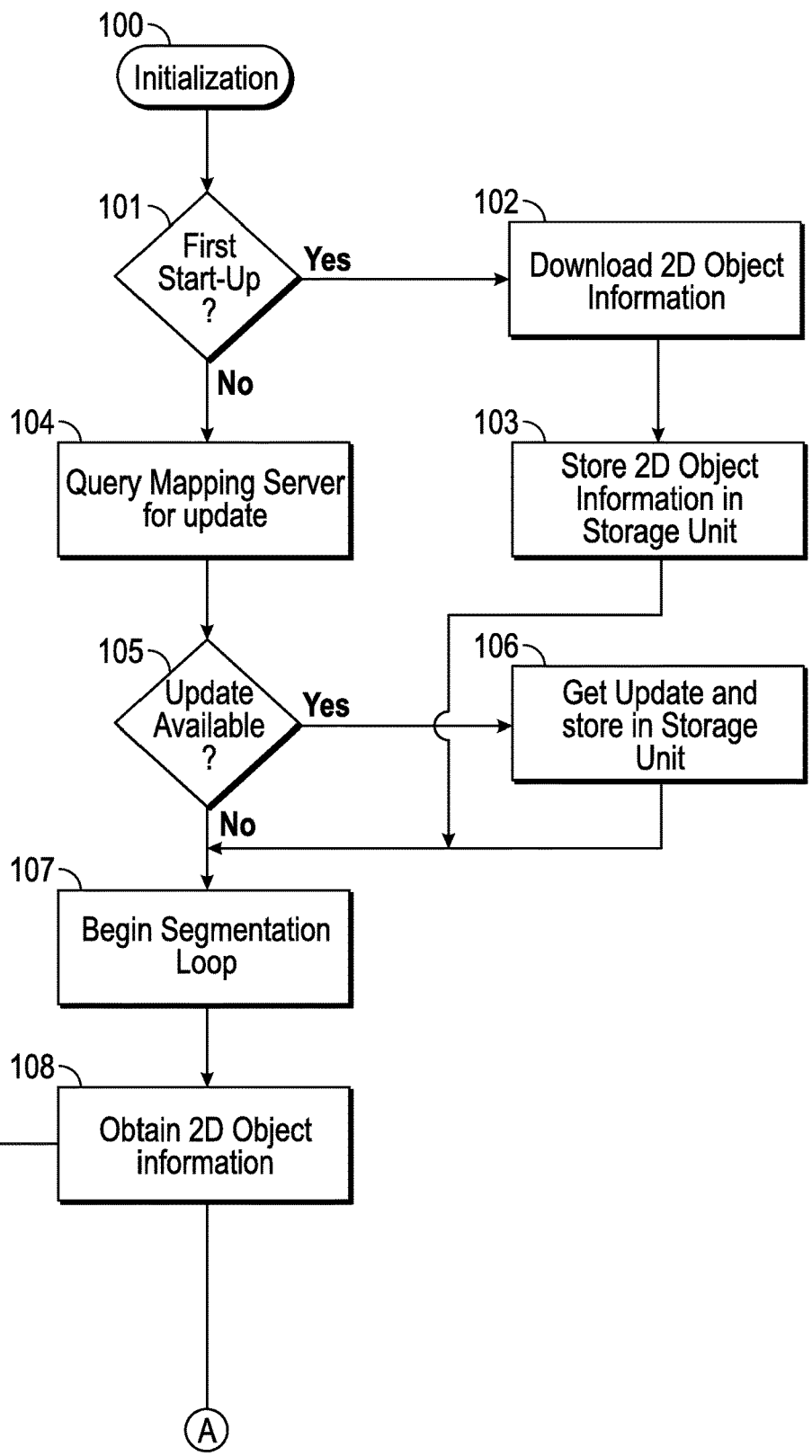
FIGS. 2A and 2B show an example of the operation of system 2 for generating segmented vehicle image data in a schematic flow diagram.
Figure 2B:
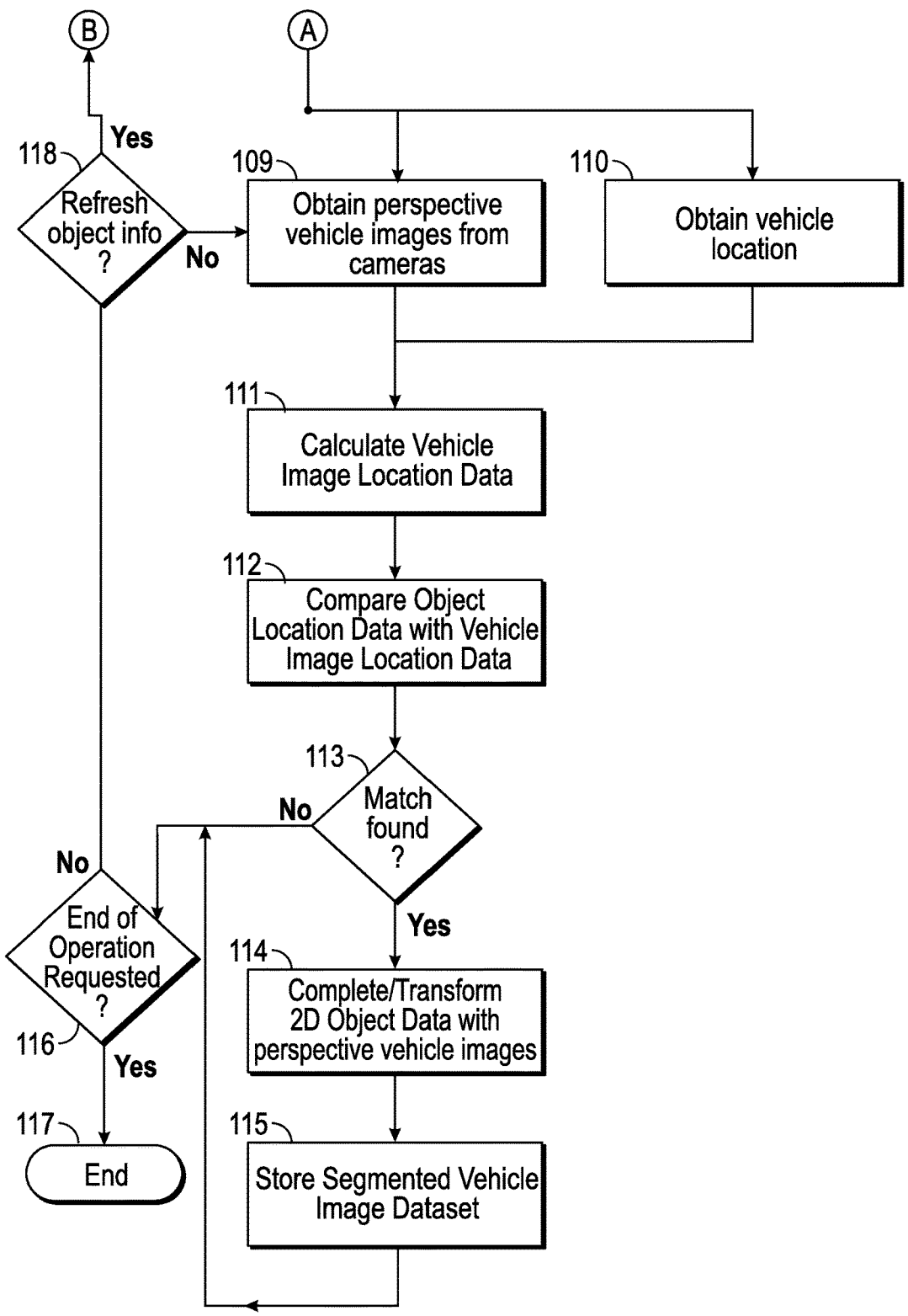

FIGS. 2A and 2B show an example of the operation of system 2 for generating segmented vehicle image data in a schematic flow diagram.

The operation of system 2 begins in step 100 with the initialization of the system 2 by powering the vehicle 1. In step 101, the segmentation processor 3 determines, whether the current initialization is the first start-up of the system 2 or whether the system 2 has been operated before. Segmentation processor 3 accordingly queries storage unit 7 and a corresponding configuration bit, stored in storage unit 7. In case the current initialization is the first start of the system 2, segmentation processor 3 in step 102 contacts a mapping server (not shown) over LTE modem 6 to obtain 2D object information, which is downloaded from the mapping server consequently. The 2D object information is then stored in storage unit 7 in step 103.

In case the segmentation processor 3 in step 101 determines that the current initialization of step 100 is not the first start-up, i.e., that the system 2 is already configured, the segmentation processor 3 in step 104 queries the mapping server for an update of the 2D object information. If this is the case, segmentation processor 3 in step 106 obtains the update from the mapping server over LTE modem 6 and stores the update in storage unit 7. According to the present embodiment, the update of the 2D object information is an incremental update to keep the transmitted data volume low.

The 2D object information according to the present embodiment comprises object data, an associated object identifier, and object location data. The object data is vectorized object shape data of "flat" road surface objects, obtained from processing remotely sensed images. The object location data comprises high-precision geolocation data, i.e., having a spatial resolution of at least 50 cm, preferably 5 cm, and particularly 1 cm.

Figure 3:
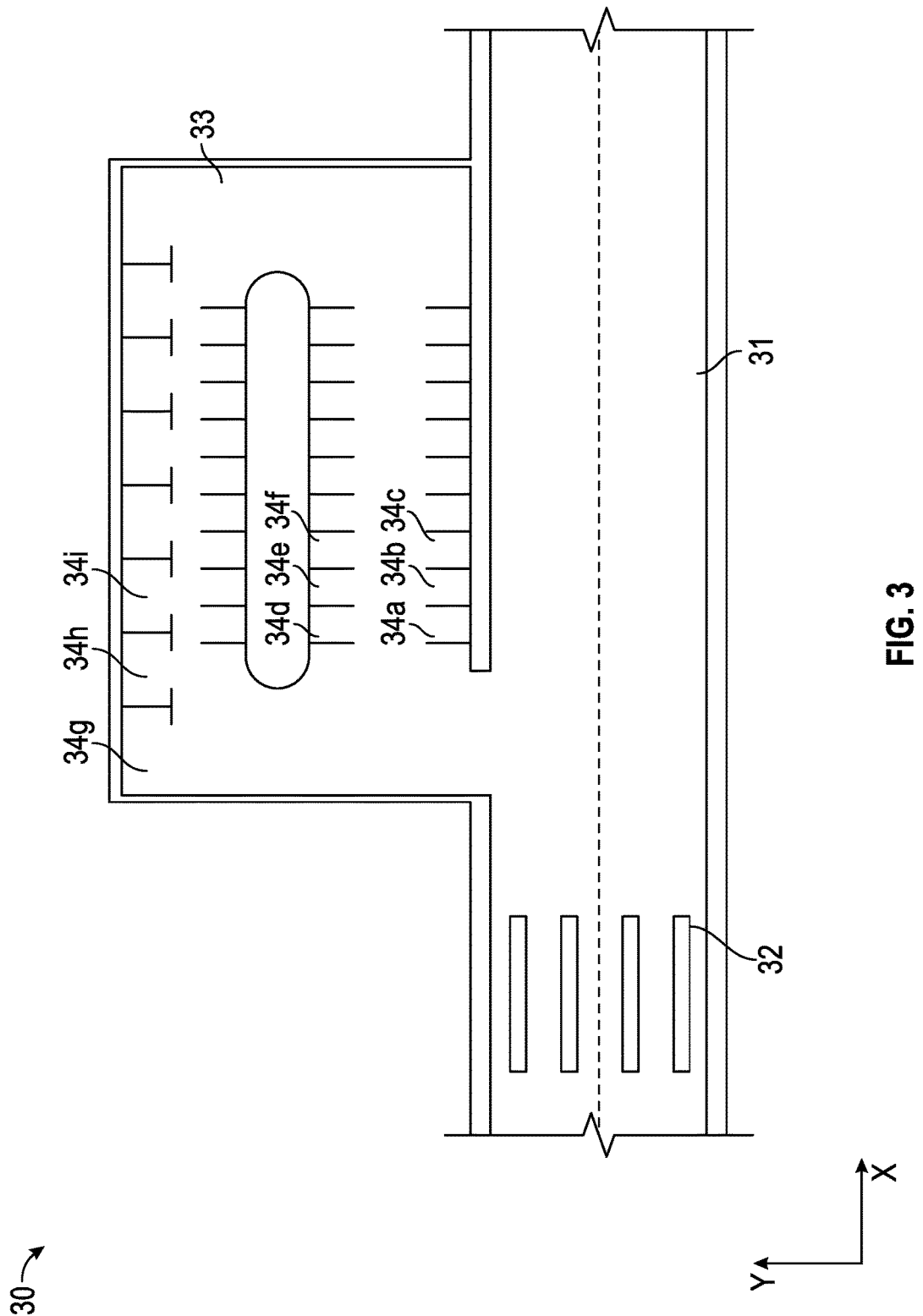
FIG. 3 shows a part of an aerial image in a schematic view.

In this embodiment, the remotely sensed images are aerial images of the earth surface. FIG. 3 shows a part of an aerial image 30 in a schematic view. The image 30 shows a typical urban street scenario with a road 31 having a pedestrian crosswalk 32. The road 31 also connects to a parking lot 33 with various parking spaces 34*a-i*. It is noted that for reasons of clarity, only some of the parking spaces 34*a-i* have been marked with a reference numeral in FIG. 3.

The aforesaid crosswalk 32, parking lot 33, and parking spaces 34*a-i* are in the present context considered to be road surface objects. As will be apparent from FIG. 3, these road surface objects are in a two-dimensional reference plane, i.e., in this embodiment on the pavement, and thus are "flat".

Using aerial images, such as image 30, 2D object information of the road surface objects is generated automatically by the mapping server using typical Object-Based Image Analysis. An example of generating 2D object information for parking lots is described in WO 2015/057325 A1.

Figure 4:
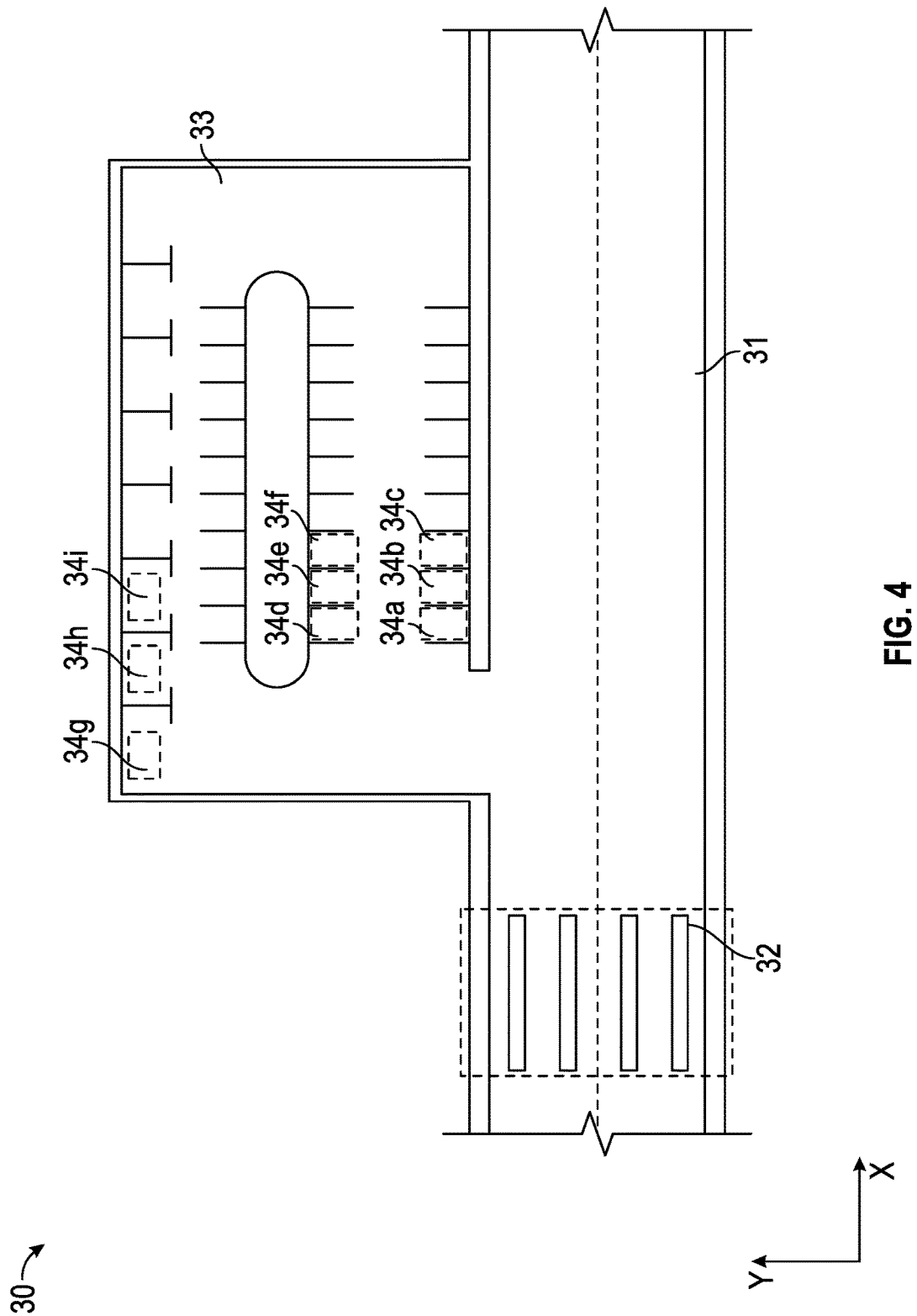
FIG. 4 shows the aerial image of FIG. 3 with an overlay showing 2D object data.

FIG. 4 shows the aerial image 30 of FIG. 3 with an overlay showing the resulting object shape information of the crosswalk 32, the parking lot 33, and some parking spaces 34*a-i*. Again and corresponding to FIG. 3, only some of the parking spaces 34 have been marked with a reference numeral in FIG. 34 and also show the correspondingly generated object shape information.

The following 2D object information of the road surface objects shown in FIGS. 3 and 4 is stored on the mapping server:

| Object No. | Object identifier | Object location Latitude | Object location Longitude | Object shape data type | Object shape data parameter 1 | Object shape data parameter 2 |
|---|---|---|---|---|---|---|
| 1 | Crosswalk 32 | 37.486801 | −122.216831 | Rectangle | x-width: 3 m | y-length: 10 m |
| 2 | Parking lot 33 | 37.48677344 | −122.2168355 | Rectangle | x-width: 40 m | y-length: 30 m |
| 3 | Parking space 34a | 37.48674589 | −122.21684 | Rectangle | x-width: 2.5 m | y-length: 5 m |
| 4 | Parking space 34b | 37.486801 | −122.216831 | Rectangle | x-width: 2.5 m | y-length: 5 m |
| 5 | Parking space 34c | 37.48669078 | −122.216849 | Rectangle | x-width: 2.5 m | y-length: 5 m |
| 6 | Parking space 34d | 37.48666322 | −122.2168535 | Rectangle | x-width: 2.5 m | y-length: 5 m |
| 7 | Parking space 34e | 37.48663567 | −122.216858 | Rectangle | x-width: 2.5 m | y-length: 5 m |

-continued

| Object No. | Object identifier | Object location Latitude | Object location Longitude | Object shape data type | Object shape data parameter 1 | Object shape data parameter 2 |
|---|---|---|---|---|---|---|
| 8 | Parking space 34f | 37.48660811 | −122.2168625 | Rectangle | x-width: 2.5 m | y-length: 5 m |
| 9 | Parking space 34g | 37.48658056 | −122.216867 | Rectangle | x-width: 2.5 m | y-length: 5 m |
| 10 | Parking space 34h | 37.48658056 | −122.216867 | Rectangle | x-width: 2.5 m | y-length: 5 m |
| 11 | Parking space 34i | 37.486553 | −122.2168715 | Rectangle | x-width: 2.5 m | y-length: 5 m |
| 12 | . . . | . . . | . . . | . . . | . . . | . . . |

It is noted that the above-mentioned object location latitude and longitude data comprises exemplary values only to show the accuracy needed in the present, GPS-based embodiment, but does not refer to the arrangement of the objects, relative to each other, as shown in FIG. 4. In this example, the latitude and longitude refers to a reference point of the respective object, e.g., a corner of the shown polygons. Further, it is noted that the "object shape parameters" as shown certainly depend on the respective shape, as in typical vector graphics. For example, in case of a circle, it would be sufficient to provide the radius in addition to the latitude/longitude of a reference point, such as the center of the circle. Other shapes may require more than two parameters.

As discussed in the preceding with reference to FIG. 2, 2D object information is provided to the system for generating segmented vehicle image data 2 and then stored in storage unit 7. Once it is determined that current 2D object information is present in storage unit 7, the image segmentation begins in step 107.

In step 108, 2D object information is obtained by the segmentation processor 3, i.e., loaded from storage unit 7. In particular, and depending on the data size of the 2D object information, the segmentation processor 3 may load a full dataset of 2D object information, or may load a partial dataset of 2D object information. For example, in case of a large data size of the 2D object information, the segmentation processor 3 may only load a subset of the 2D object information, namely where the object location data is close to the current position of vehicle 1, i.e., within a radius of 20 m, as it is unlikely that objects are determined that are far away from vehicle 1.

In step 109, perspective vehicle image (data) is obtained from video cameras 10-13 by image processor 3. According to the present embodiment, the perspective vehicle image data corresponds to multiple still images (frames), taken out of constantly provided video stream of the cameras 10-13.

In parallel thereto and in step 110, the vehicle's geolocation is obtained by segmentation processor 3 from GPS receiver module 8. The data from steering/drive control unit 9 enhances the precision of the GPS position, as discussed in the preceding.

In step 111, the segmentation processor 3 calculates the geolocation for every pixel of the multiple still images of the perspective vehicle image data using predefined camera calibration parameters, which include a fixed mapping of the field of view of each of the cameras 10-13 to the position, as determined by the GPS module 8.

The resulting vehicle image location data is compared with the object location data of the 2D object information in step 112. In case a matching location is found, the associated 2D object data is correlated with the respective still image in step 114. This step comprises transforming the 2D object data from the associated two-dimensional "ground/surface/pavement" reference plane to the perspective reference frame of the perspective still image using a linear algebra transformation with a pre-calculated transformation matrix.

The transformation technique used here is also known as "homography" and is a known technique in computer vision for mapping a set of points from one plane to another plane.

In the present embodiment, a first plane is the ground reference plane of the 2D object data, having a set of points corresponding to the respective object. A second plane is the perspective reference (image) frame, as taken by the cameras 10-13.

The pre-calculated transformation or "homography" matrix comprises a linear transformation capable of mapping any point in the first plane to a corresponding point in the second plane, the latter of which corresponds to the camera image. The homography matrix is originally obtained by solving a set of linear equations given a set of pairs of true mappings between the two planes. Details of homography can, e.g. be found at https://en.wikipedia.org/wiki/Homography (computer_vision)

The result of this transformation, i.e., the transformed object data, is then stored together with the respective still image in storage unit 7 in step 115 as a "segmented vehicle image dataset". The dataset can then be used for further processing, as will be discussed in more detail in the following.

In case no match is found in step 113 and in step 116, the segmentation processor 3 determines, whether the user requested the operation of system 2 to end, e.g., by stopping the vehicle 1 and turning of the ignition. If this is the case, operation ends in step 117. Otherwise, the operation continues with the acquisition of a new set of still images from cameras 10-13 in step 109, unless the determination in step 118 results in that a refresh of the loaded 2D object information is necessary. A refresh is necessary, e.g., in case the system 2 determines that the vehicle 1 has moved more than 10 m to assure that the correct 2D object information is in the memory of segmentation processor 3.

As can be seen from FIG. 2B, the above discussed procedure applies also after successful storing of the segmented vehicle image dataset in step 115.

Figure 5:
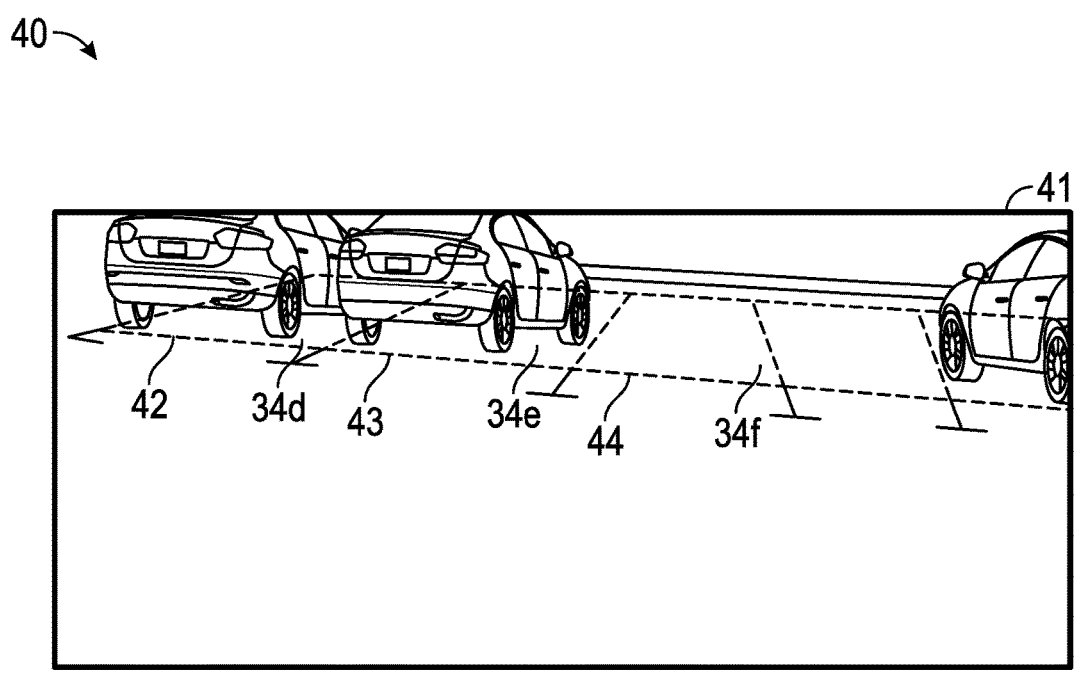
FIG. 5 shows an exemplary segmented vehicle image dataset in a schematic view.

FIG. 5 shows an exemplary segmented vehicle image dataset 40 in a schematic view. The dataset 40 comprises a perspective vehicle (still) image 41, obtained from left camera 12 of vehicle 1. The image 41 shows a section of parking lot 33 with parking spaces 34d, 34e, and 34f. Furthermore, FIG. 5 also shows transformed, and thus now perspective object data 42-44 of the segmented vehicle image dataset in an overlay. As can be seen, object data 42-44 comprises rectangles that are aligned with parking spaces 34d, 34e, and 34f. The perspective of the rectangles now matches the perspective of the image 41.

As discussed in the preceding, the segmented vehicle image dataset can be used for further processing, once generated in the described segmentation process. In one exemplary embodiment, the segmented vehicle image datasets, stored in storage unit 7 are transmitted to a server system 60 in predefined intervals.

Figure 6:
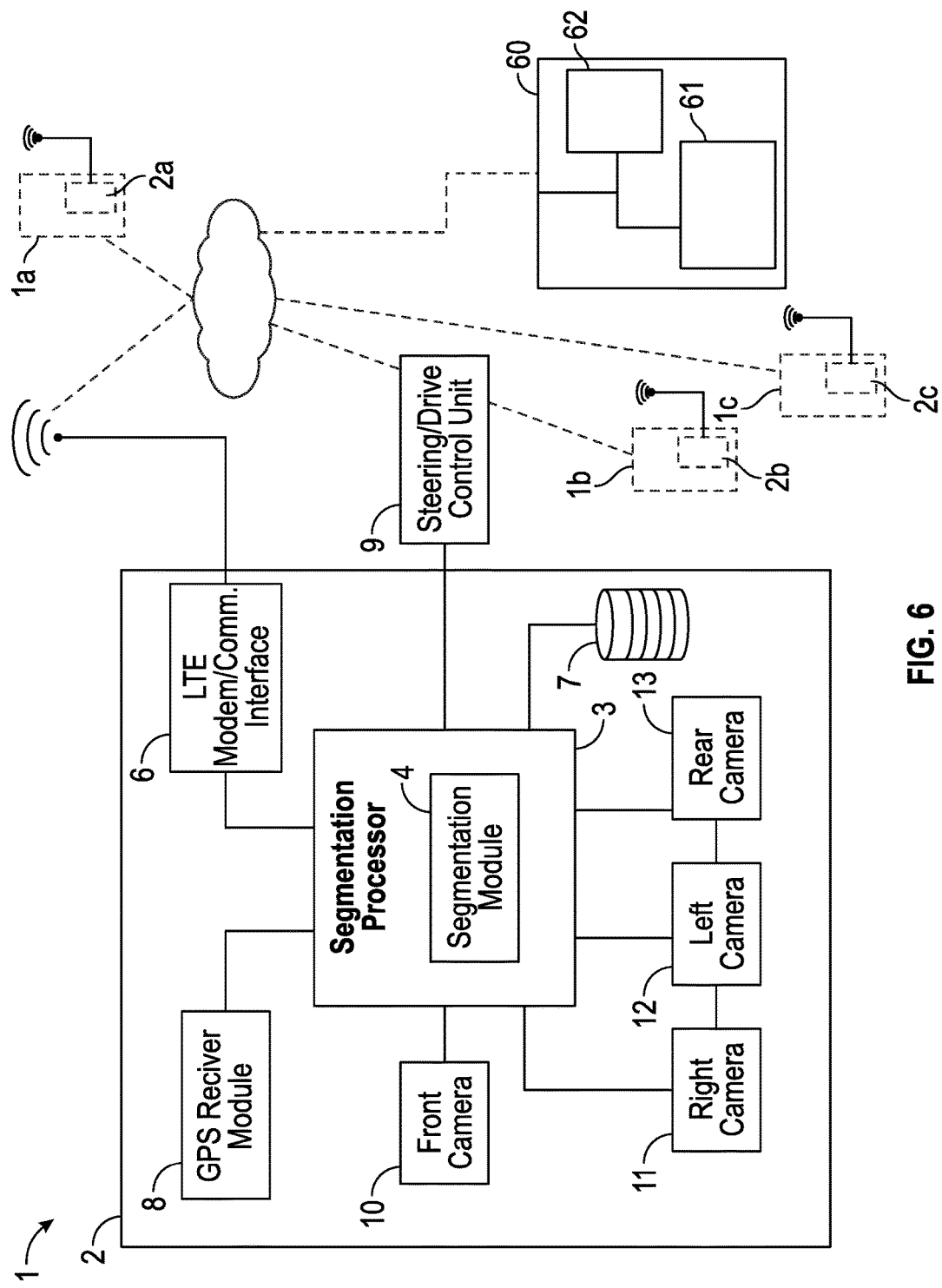
FIG. 6 shows a schematic block diagram of a system for processing of segmented vehicle image datasets.

FIG. 6 shows a schematic block diagram of the setup according to this embodiment. As can be seen from the FIG., system 2 of vehicle 1 is connected to server system 60 over a wireless data connection using LTE modem 6. The transmission of the segmented vehicle image data from storage unit 7 to server system 60 is conducted every 5 minutes, however only in case of the availability of a cellular network connection at the respective vehicle's location.

Server system 60 may be located at a suitable facility, such as at a data center of the vehicle owner, vehicle manufacturer, or a corresponding service provider, i.e., "cloud based". Server system 60 comprises the aforementioned mapping server 62 and an artificial neural network system 61 that uses the incoming segmented vehicle image datasets as training data for a software-based road feature detector. A corresponding road feature detector may, once sufficiently trained, be used in autonomous driving systems. For example, the road feature detector may be configured to detect available parking spaces where the vehicle can park itself, or upload the location of free parking spaces to the "cloud", so that other vehicles or drivers are informed of available parking.

Certainly, and as indicated in FIG. 6, a corresponding neural network system 61 may optionally be provided with segmented vehicle image data from multiple vehicles 1, 1a, 1b, 1c that each comprise a system for generating segmented vehicle image data 2, 2a, 2b, 2c, as discussed in the preceding. It is noted that FIG. 6 shows only some of the components of vehicle 1 for reasons of clarity.

Figure 7:
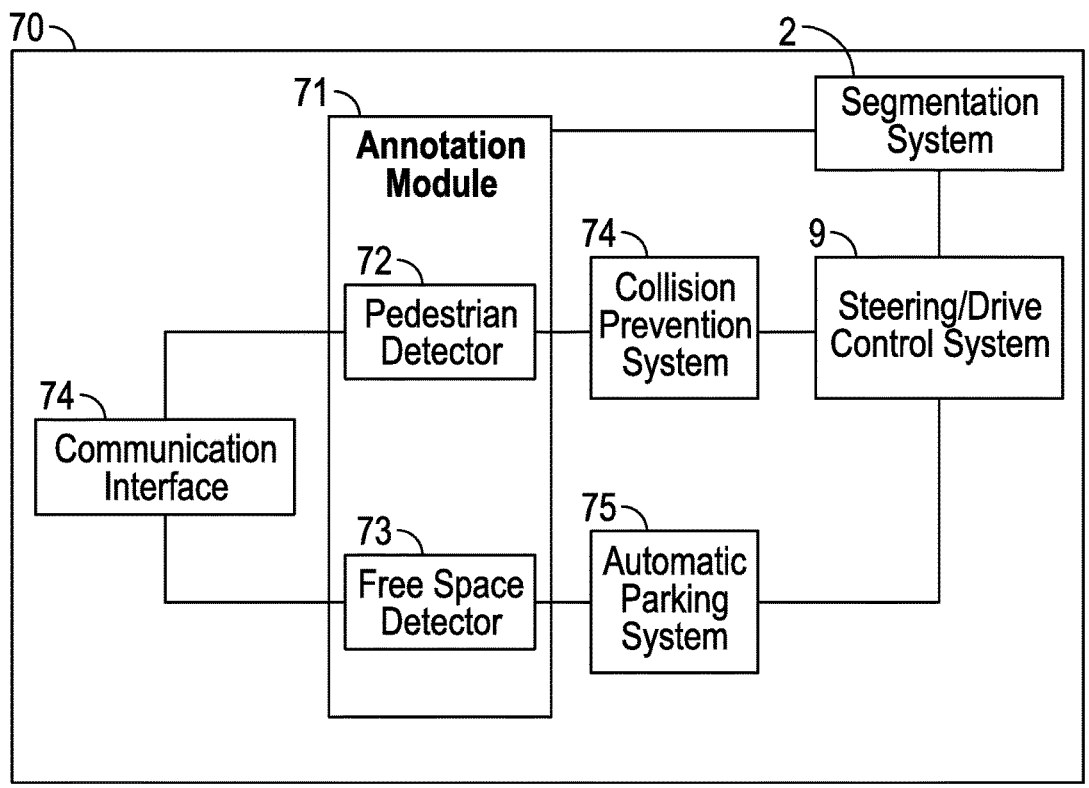
FIG. 7 shows a further embodiment of a vehicle having a system for generating segmented vehicle image data in a schematic block diagram.

FIG. 7 shows a further embodiment of a vehicle 70 having a system 2 for generating segmented vehicle image data in a schematic block diagram. The setup of segmentation system 2 corresponds to the setup discussed in the preceding. Vehicle 70 also comprises the steering/drive control system 9 as discussed, but further comprises annotation module 71 with a pedestrian detector sub-module 72 and a free parking space detector sub-module 73. The pedestrian detector module 72 is connected to a collision prevention system 74 and the free parking space detector 73. While the pedestrian detector sub-module 72 detects pedestrians in the segmented vehicle image datasets, the free space detector sub-module 73 determines, whether a parking space, comprised in the segmented vehicle image data set is available or occupied. Both sub-modules 72, 73 comprise suitable computer vision algorithms and provide the result of the respective determination to a corresponding assisted driving system.

In the present embodiment, the pedestrian detector sub-module 72 determines, whether a pedestrian is visible in the image data of a segmented vehicle image dataset in the case of a certain object type, namely according to the present example in case of the object type corresponding to "crosswalk".

In case a pedestrian is detected within a crosswalk, a road object status corresponding to "pedestrian present in crosswalk" is set for the object "crosswalk" and the annotated object information is transmitted to collision prevention system 74, which then initiates a controlled braking maneuver.

It is noted that the pedestrian detector 72 according to the present embodiment only determines the mandatory yield to pedestrians in crosswalks, so that the vehicle 70 in this case can be stopped in a controlled way. Optionally, pedestrian detector sub-module 72 may additionally be configured to continuously scan a live stream from front camera 10 (not shown in FIG. 7) for pedestrians in the vehicle's 70 path and if detected, provide a corresponding information to the collision prevention system 74 to allow pre-charging of the vehicle's brakes.

The free parking space detector sub-module 73 determines, whether a parking space is available or occupied in case the segmented vehicle image dataset comprises an object with an identifier corresponding to "parking space". Correspondingly annotated object information is provided to the automatic parking system 75 to allow an automatic parking maneuver to begin if so desired by the vehicle's operator. Referring to the exemplary segmented vehicle image dataset of FIG. 5, the following object information results:

| Object No. | Object identifier | Object location Latitude | Object location Longitude | Object shape data type | Object shape data parameter 1 | Object shape data parameter 2 | Object status |
|---|---|---|---|---|---|---|---|
| ... | ... | ... | ... | ... | ... | ... | ... |
| 6 | Parking space 34d | 37.48666322 | −122.2168535 | Rectangle | x-width: 2.5 m | y-length: 5 m | Occupied |
| 7 | Parking space 34e | 37.48663567 | −122.216858 | Rectangle | x-width: 2.5 m | y-length: 5 m | Occupied |
| 8 | Parking space 34f | 37.48660811 | −122.2168625 | Rectangle | x-width: 2.5 m | y-length: 5 m | Available |
| ... | ... | ... | ... | ... | ... | ... | | system 74. The free parking space detector is connected to an automatic parking system 75. Both, the collision prevention system 74, and the automatic parking system 75 are connected to the drive control system 9 for control of the vehicle's movements.

Annotation module 71 is connected to segmentation system 2 to receive segmented vehicle image datasets and processes the datasets further. In particular, annotation module 71 automatically annotates the segmented image datasets, i.e., automatically generates metadata for one or more objects in the segmented vehicle image dataset. In the present embodiment, the annotation module 71 determines a road object status for at least one object.

Figure 8:
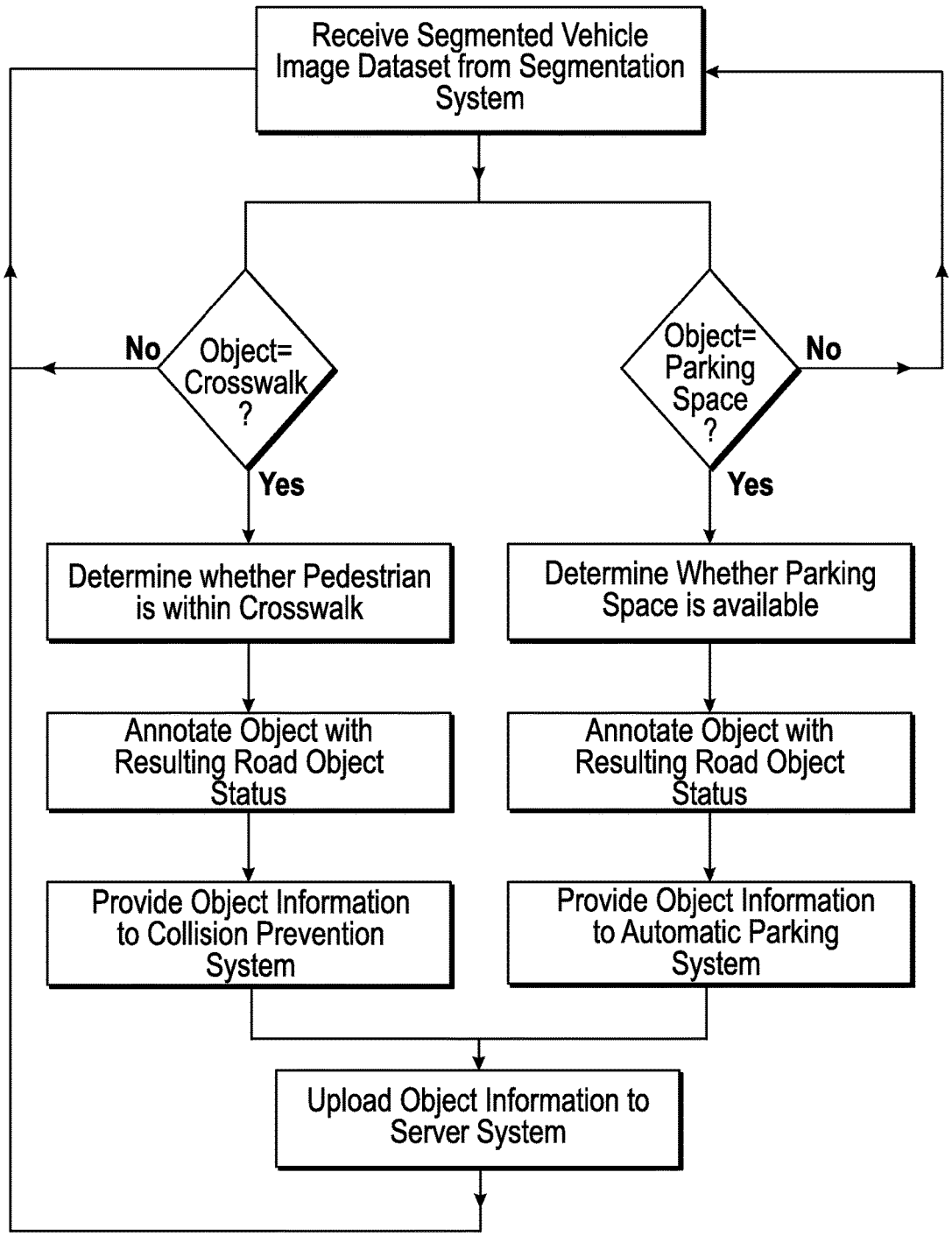
FIG. 8 shows an exemplary flow diagram of the operation of the system according to FIG. 7.

As discussed in the preceding, annotation module 71 comprises two sub-modules, namely the pedestrian detector In both cases, i.e., the annotation by pedestrian detector sub-module 72 and the annotation by the free parking space detector sub-module 73, the annotated object information is provided to a wireless communication interface 74 for upload to a central server system. The annotated object information can then be shared with other drivers to provide a warning in case of a pedestrian in a crosswalk and to provide information about available parking in case of a free parking space. The operation of both modules 72, 73 is also shown in the exemplary flow chart of FIG. 8.

It is noted that while the segmentation process, shown in FIGS. 2A and 2B, and explained with reference thereto, comprises storing the segmented vehicle image dataset in storage unit 7 in step 115, this is not necessarily required in the present example of an "online" further processing of the segmented vehicle image datasets. Here, the segmented dataset may directly be provided to annotation module 71 after step 114 in a corresponding embodiment. Certainly, and in another embodiment, the segmented vehicle image dataset may also be retrieved by annotation module 71 from the storage unit 7 after storing the latter in step 115.

Figure 9:
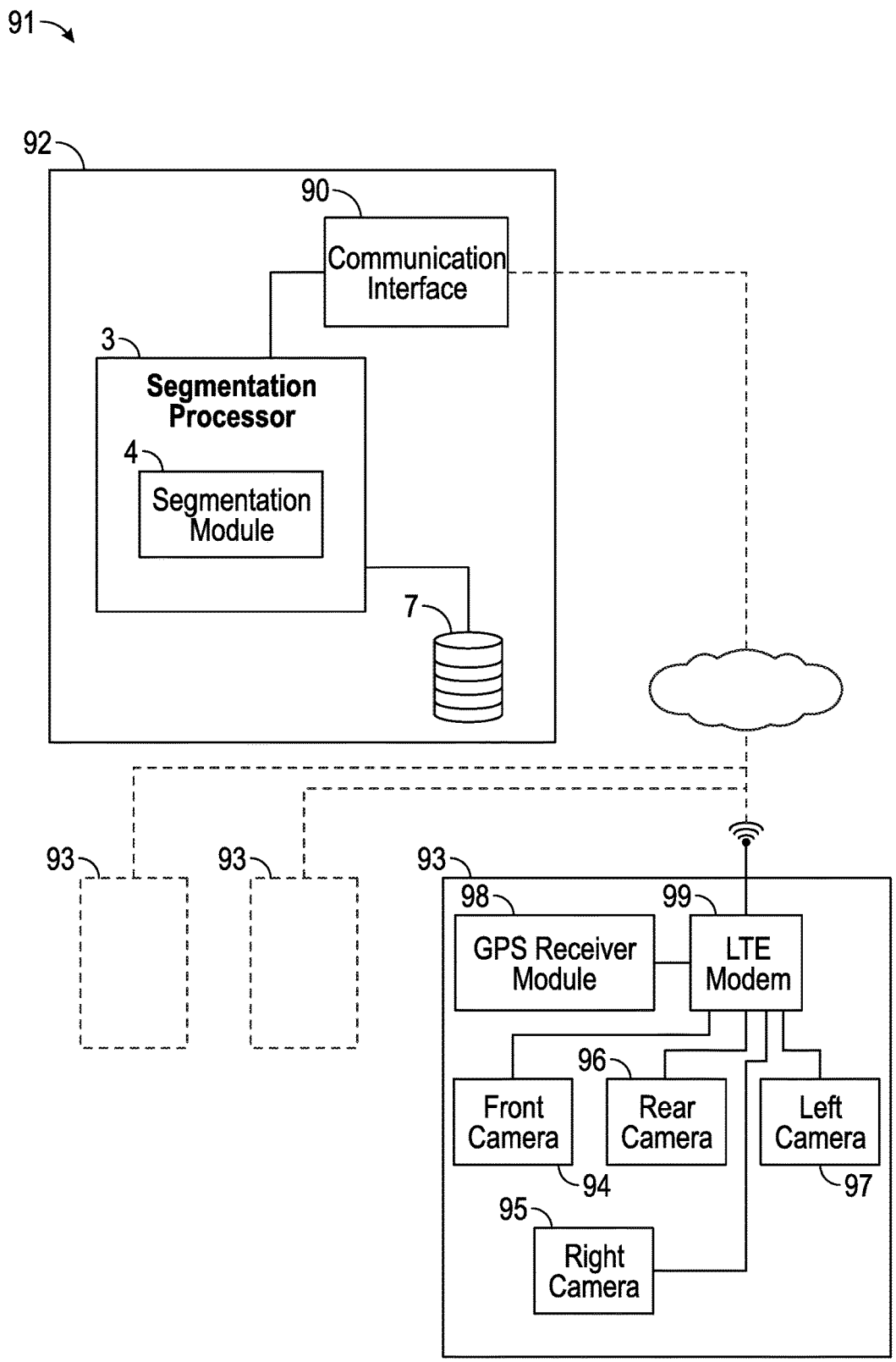
FIG. 9 shows a second embodiment of a system for generating segmented vehicle image data in a schematic block diagram.

FIG. 9 shows a second embodiment of a system for generating segmented vehicle image data 92 in a schematic block diagram. The system 92 corresponds to the system 2, discussed in the preceding, with the exception that system 92 is not provided as a part of a vehicle, but formed integrally with a (cloud) server 91. Correspondingly, system 92 does not comprise a GPS receiver module, nor cameras. According to the present embodiment, perspective vehicle image data and associated vehicle geolocation data is provided to system 92 by multiple remote data gathering vehicles 93 over communication interface 90. Perspective vehicle image data is collected by cameras 94-97 and vehicle geolocation data is obtained by GPS receiver module 98. LTE modem 99 is connected wirelessly to communication interface 90. Operation of segmentation system 92 corresponds to the preceding discussion of FIGS. 2A and 2B with the exception that perspective vehicle image data and vehicle geolocation data is provided by remove data gathering vehicles 93, as discussed in the preceding.

While the invention has been illustrated and described in detail in the drawings and foregoing description, such illustration and description are to be considered illustrative or exemplary and not restrictive; the invention is not limited to the disclosed embodiments. For example, it is possible to operate the invention in any of the preceding embodiments, wherein

- system 2 is not installed in a vehicle 1, but is provided as part of a server, e.g., in a cloud computing/server system,
- storage unit 7, instead of or in addition to flash memory, comprises one or more of a magnetic data storage device, an optical storage device, or non-volatile or volatile solid state memory,
- instead of cameras 10-13 being of color and infrared type, cameras 10-13 are grayscale cameras,
- instead of or in addition to video cameras 10-13, one or more of a at least one still image camera, a radar or LIDAR scanner, an ultrasonic sensor, or any other type of sensor that allows to provide perspective vehicle image data, i.e., pixel data, is used in system 2, 92,
- instead of cameras 10-13, a single camera is used,
- instead of automatically processing remotely sensed image data to generate 2D object information, the image data is processed manually to generate 2D object data,
- instead of annotation module 71 of FIG. 7 being provided separate from the segmentation system 2, annotation module 71 being formed integrally with segmentation system 2 and/or with segmentation processor 3, and/or, additional modules are provided as part of annotation module 71, such as a road arrow direction detector.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A computer-implemented method of generating segmented vehicle image data, comprising at least the steps of
    obtaining 2D object information having at least 2D object data and object location data of one or more objects;
    obtaining perspective vehicle image data from one or more sensors of a vehicle;
    determining vehicle image location data for at least a portion of said vehicle image data;
    comparing said object location data with said vehicle image location data; and
    in case said object location data corresponds to said image location data, correlating said 2D object data with said perspective vehicle image data using the object location data and the vehicle image location data to obtain a segmented vehicle image dataset, wherein the step of correlating comprises transforming the 2D object data from a two-dimensional reference plane to a vehicular perspective reference frame of the perspective vehicle image data.

2. The computer-implemented method of generating segmented vehicle image data according to claim 1, wherein said 2D object data is correlated with a two-dimensional reference plane and said two-dimensional reference plane is parallel to a driving surface of said vehicle.

3. The computer-implemented method of generating segmented vehicle image data according to claim 1, wherein said 2D object information is obtained from remotely sensed image data.

4. The computer-implemented method of generating segmented vehicle image data according to claim 1, further comprising the step of automatically processing remotely sensed image data to obtain said 2D object information.

5. The computer-implemented method of generating segmented vehicle image data according to claim 1, wherein said 2D object data comprises vector information.

6. The computer-implemented method of generating segmented vehicle image data according to claim 1, wherein said 2D object data comprises primitive object data.

7. The computer-implemented method of generating segmented vehicle image data according to claim 1, wherein said object location data and said vehicle image location data comprise high-precision geolocation data.

8. The computer-implemented method of generating segmented vehicle image data according to claim 1, further comprising the step of automatically annotating the segmented vehicle image dataset.

9. The computer-implemented method of generating segmented vehicle image data according to claim 8, wherein the step of annotating the segmented vehicle image dataset comprises determining a road object status of at least one object.

10. The computer-implemented method of generating segmented vehicle image data according to claim 1, wherein the segmented vehicle image dataset is provided to an assisted/automated driving system of a vehicle.

11. The computer-implemented method of generating segmented vehicle image data according to claim 1, wherein the segmented vehicle image dataset is provided as training data to an artificial neural network system.

12. A machine-readable non-transitory recording medium including contents that are configured to cause a computing device conduct the method according to claim 1.

13. A system for generating segmented vehicle image data, comprising
- a communication interface to receive 2D object information having at least 2D object data and object location data of one or more objects, perspective vehicle image data from one or more sensors of a vehicle, and vehicle image location data for at least a portion of said vehicle image data from a positioning module of a vehicle; and
- a segmentation processor, configured to
  - compare said object location data with said vehicle image location data; and
  - in case said object location data corresponds to said image location data, correlate said 2D object data with said perspective vehicle image data using the object location data and the vehicle image location data to obtain a segmented vehicle image dataset, wherein correlating comprises transforming the 2D object data from a two-dimensional reference plane to a vehicular perspective reference frame of the perspective vehicle image data.

14. The system for generating segmented vehicle image data according to claim 13, further comprising an annotation module, configured to determine a road object status of at least one object.

15. A vehicle with a system for generating segmented vehicle image data, comprising
- a communication interface to receive 2D object information having at least 2D object data and object location data of one or more objects;
- one or more sensors for obtaining perspective vehicle image data;
- a position detector for obtaining vehicle image location data for at least a portion of said vehicle image data; and
- a segmentation processor, configured to
  - compare said object location data with said vehicle image location data; and
  - in case said object location data corresponds to said image location data, correlate said 2D object data with said perspective vehicle image data using the object location data and the vehicle image location data to obtain a segmented vehicle image dataset, wherein correlating comprises transforming the 2D object data from a two-dimensional reference plane to a vehicular perspective reference frame of the perspective vehicle image data.

16. The vehicle of claim 15, further comprising an annotation device, configured to determine a road object status of at least one object.

* * * * *